(12) United States Patent
Li et al.

(10) Patent No.: US 9,615,362 B2
(45) Date of Patent: Apr. 4, 2017

(54) METHOD AND APPARATUS USED FOR COMMUNICATION

(71) Applicant: Huawei Technologies Co., Ltd., Shenzhen, Guangdong (CN)

(72) Inventors: Yue Li, Shenzhen (CN); Xiaolong Guo, Beijing (CN); Song Zhu, Beijing (CN); Shihua Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 263 days.

(21) Appl. No.: 14/587,632

(22) Filed: Dec. 31, 2014

(65) Prior Publication Data

US 2015/0117431 A1 Apr. 30, 2015

Related U.S. Application Data

(63) Continuation of application No. PCT/CN2012/078197, filed on Jul. 4, 2012.

(51) Int. Cl.
*H04W 72/04* (2009.01)
*H04L 5/00* (2006.01)
*H04W 76/02* (2009.01)

(52) U.S. Cl.
CPC ......... *H04W 72/042* (2013.01); *H04L 5/0092* (2013.01); *H04W 76/023* (2013.01)

(58) Field of Classification Search
CPC .................................................. H04L 5/0092
USPC .............................................. 370/338
See application file for complete search history.

(56) References Cited

U.S. PATENT DOCUMENTS

| | | | |
|---|---|---|---|
| 2005/0009524 A1 | 1/2005 | Garani et al. | |
| 2009/0270099 A1* | 10/2009 | Gallagher | H04W 8/08 455/435.1 |
| 2010/0195621 A1* | 8/2010 | Kekki | H04W 48/17 370/332 |
| 2011/0130165 A1 | 6/2011 | Yuan et al. | |
| 2011/0294435 A1* | 12/2011 | Miller | H04L 41/0893 455/67.11 |
| 2012/0231739 A1* | 9/2012 | Chen | H04B 7/026 455/41.2 |
| 2012/0276872 A1* | 11/2012 | Knauth | H04L 63/18 455/411 |

FOREIGN PATENT DOCUMENTS

CN 1555636 A 12/2004
WO WO 2011/060589 A1 5/2011

* cited by examiner

*Primary Examiner* — Shripal Khajuria

(57) ABSTRACT

The present invention relates to a method and an apparatus used for communication, including: when a base station receives downlink data through a first system bearer of a first user equipment, detecting, by the base station, according to a context of the first user equipment stored by the base station itself, whether a radio bearer which is of other user equipment except the first user equipment and assists the first user equipment or the first system bearer in transmitting data exists in the base station; if the radio bearer exists, selecting, by the base station, from the first user equipment and the other user equipment except the first user equipment, at least one user equipment that transmits the downlink data; and sending, by the base station, the downlink data through a specified radio bearer corresponding to the at least one user equipment.

19 Claims, 9 Drawing Sheets

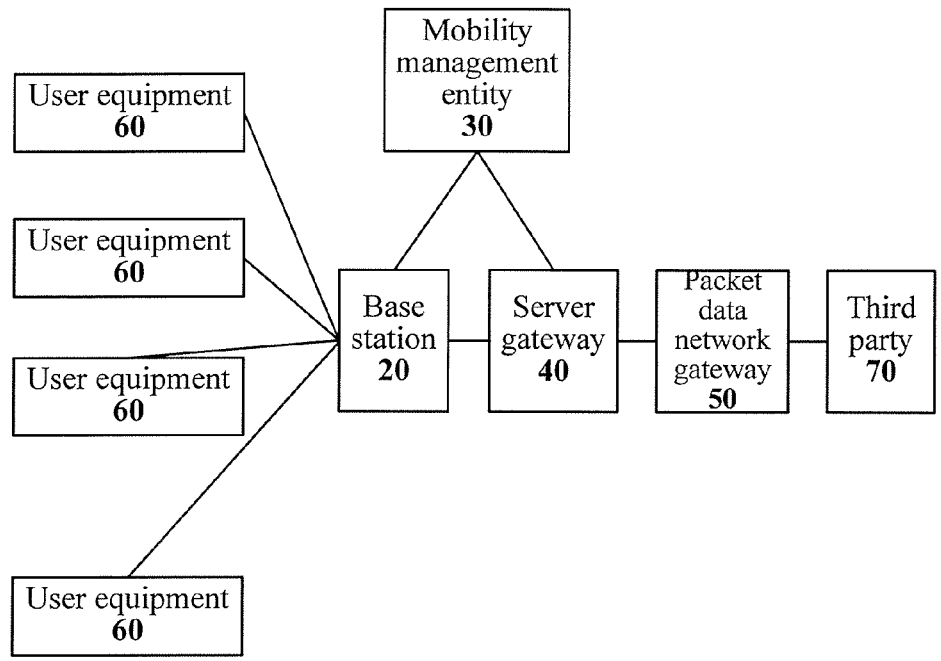

FIG. 1

101a: When a base station receives downlink data through a first system bearer of a first user equipment, the base station detects, according to a context of the first user equipment stored by the base station itself, whether a radio bearer which is of another user equipment except the first user equipment and assists the first user equipment or the first system bearer in transmitting data exists in the base station 102a: If the radio bearer exists, the base station selects, from the first user equipment and the another user equipment except the first user equipment, at least one user equipment that transmits the downlink data 103a: The base station sends the downlink data through a specified radio bearer corresponding to the at least one user equipment

FIG. 1a

101b: A first user equipment receives, through a first radio bearer of the first user equipment, downlink data sent by a base station 102b: Send the downlink data to a second user equipment according to stored information of short distance communication with the second user equipment, where the first radio bearer is a radio bearer of the first user equipment that assists the second user equipment or a first system bearer of the second user equipment in transmitting data

FIG. 1b

101c: A first user equipment receives, through a first short distance communication bearer, downlink data sent by a second user equipment 102c: Process the downlink data at a composition layer according to first short distance communication bearer information stored by the first user equipment

FIG. 1c

201a: When a base station receives uplink data which is sent, through a first radio bearer, by a first user equipment, check, according to a context of the first user equipment stored by the base station, whether the first radio bearer is a radio bearer that assists a second user equipment except the first user equipment or a first system bearer of a second user equipment except the first user equipment in transmitting data 202a: When a checking result is positive, the base station sends the uplink data to an uplink node through a system bearer of the second user equipment or the first system bearer of the second user equipment

FIG. 2a

201b: A first user equipment receives, through a first short distance communication bearer, uplink data sent by a second user equipment 202b: Send the uplink data to a base station according to stored information of short distance communication with the second user equipment

FIG. 2b

201c: When a first user equipment in a user equipment needs to transmit uplink data through a first system bearer of the first user equipment, detect, according to a context stored by the first user equipment, whether a short distance communication bearer which is of another user equipment except the first user equipment in the user equipment and is used for assisting the first user equipment or the first system bearer in transmitting data exists in the first user equipment 202c: When a detection result is positive, determine, in the first user equipment and the another user equipment, a user equipment suitable for transmitting the uplink data 203c: When the determined user equipment is the first user equipment, send the uplink data to a base station through a radio bearer of the first system bearer of the first user equipment; and when the determined user equipment is at least one user equipment in the another user equipment, send the uplink data to the at least one user equipment through a short distance communication bearer between the first user equipment and the at least one user equipment

FIG. 2c

METHOD AND APPARATUS USED FOR COMMUNICATION

CROSS-REFERENCE TO RELATED APPLICATIONS

This application is a continuation of International Application No. PCT/CN2012/078197, filed on Jul. 4, 2012, which is hereby incorporated by reference in its entirety.

TECHNICAL FIELD

The present invention relates to the field of mobile communications, and in particular, to a method and an apparatus used for communication.

BACKGROUND

With the rapid development of mobile communication technologies, mobile communication systems in multiple standards already emerge, such as a global system for mobile communications (GSM) network, a general packet radio service (GPRS) network, a wideband code division multiple access (WCDMA) network, a CDMA-2000 network, a time division-synchronous code division multiple access (TD-SCDMA) network or a worldwide interoperability for microwave access (WiMAX) network. Besides providing a voice communication service, these mobile communication systems generally also provide a data communication service. Therefore, a user may use the data communication service provided by these mobile communication systems to upload and download various kinds of data.

However, current communication means are all aimed at an operation on a single user equipment. Even though another enhanced communication means is adopted to improve reliability and/or a throughput rate of data transmission of the user equipment to improve reliability of a cell-edge user equipment, it is still the operation on a single user equipment. Once an environment of the user equipment itself deteriorates, the throughput rate and/or reliability of the data transmission of the user equipment fall sharply.

SUMMARY

In view of this, embodiments of the present invention provide a method and an apparatus used for communication, which are used to solve a problem that in a case that an environment of a single user equipment itself deteriorates, the single user equipment cannot ensure a throughput rate and/or reliability of its data transmission.

In one aspect, a method used for communication is provided and includes:

when a base station receives downlink data through a first system bearer of a first user equipment, detecting, by the base station, according to a context of the first user equipment stored by the base station itself, whether a radio bearer which is of other user equipment except the first user equipment and assists the first user equipment or the first system bearer in transmitting data exists in the base station;

if the radio bearer exists, selecting, by the base station, from the first user equipment and the other user equipment except the first user equipment, at least one user equipment that transmits the downlink data; and sending, by the base station, the downlink data through a specified radio bearer corresponding to the at least one user equipment, where the specified radio bearer is a radio bearer which is in the base station and is used in the at least one user equipment for assisting the first user equipment or the first system bearer in transmitting data, and includes a radio bearer of the first user equipment or a radio bearer of the first system bearer.

In one aspect, another method used for communication is provided and includes:

receiving, by a first user equipment, through a first radio bearer of the first user equipment, downlink data sent by a base station; and sending, according to stored information of short distance communication with a second user equipment, the downlink data to the second user equipment, where the first radio bearer is a radio bearer of the first user equipment that assists the second user equipment or a first system bearer of the second user equipment in transmitting data.

In one aspect, another method used for communication is provided and includes:

receiving, by a first user equipment, through a first short distance communication bearer, downlink data sent by a second user equipment; and processing the downlink data at a composition layer according to first short distance communication bearer information stored by the first user equipment, where the first short distance communication bearer is a short distance communication bearer of the second user equipment that assists the first user equipment or a first system bearer of the first user equipment in transmitting data; and the composition layer is a new functional layer established because other user equipment except the first user equipment assists the first user equipment or the first system bearer of the first user equipment in transmitting data.

In one aspect, another method used for communication is provided and includes:

when a base station receives uplink data which is sent, through a first radio bearer, by a first user equipment, checking, according to a context of the first user equipment stored by the base station, whether the first radio bearer is a radio bearer that assists a second user equipment except the first user equipment or a first system bearer of a second user equipment except the first user equipment in transmitting data; and when a checking result is positive, sending, by the base station, the uplink data to an uplink node through a system bearer of the second user equipment or the first system bearer of the second user equipment.

In one aspect, another method used for communication is provided and includes:

receiving, by a first user equipment, through a first short distance communication bearer, uplink data sent by a second user equipment; and sending the uplink data to a base station according to stored information of short distance communication with the second user equipment, where the first short distance communication bearer is a short distance communication bearer which is in the first user equipment and is used for assisting the second user equipment or a first system bearer of the second user equipment in transmitting data.

In one aspect, an method used for communication is provided and includes:

when a first user equipment in a user equipment needs to transmit uplink data through a first system bearer of the first user equipment, detecting, according to a context stored by the first user equipment, whether a short distance communication bearer which is of other user equipment except the first user equipment in the user equipment and is used for assisting the first user equipment or the first system bearer in transmitting data exists in the first user equipment;

when a detection result is positive, determining, in the first user equipment and the other user equipment, a user equipment suitable for transmitting the uplink data;

when the determined user equipment is the first user equipment, sending the uplink data to a base station through a radio bearer of the first system bearer of the first user equipment; and when the determined user equipment is at least one user equipment in the other user equipment, sending the uplink data to the at least one user equipment through a short distance communication bearer between the first user equipment and the at least one user equipment.

In one aspect, another apparatus used for communication is provided and includes:

an executing module, configured to, when a radio bearer which is used in a second user equipment and is in a base station of a mobile communication system receives uplink data, perform, according to configuration information of the radio bearer that receives the uplink data, first specified protocol layer processing on the uplink data; a checking module, configured to check, according to a context of the second user equipment stored by the base station, whether the radio bearer that receives the uplink data is a radio bearer that assists other user equipment or a system bearer used in the other user equipment in transmitting data; and a sending module, configured to, when a checking result is positive, transmit the uplink data after the first specified protocol layer processing to a bearer that is between a radio access network and a core network in the mobile communication system and is in a corresponding system bearer of the other user equipment.

In one aspect, an apparatus used for communication is provided and includes:

a receiving unit, configured to receive downlink data through a first system bearer of a first user equipment;

a detecting unit, configured to, after the receiving unit receives the downlink data, detect, according to a context of the first user equipment stored apparatus used for communication, whether a radio bearer which is of other user equipment except the first user equipment and assists the first user equipment or the first system bearer in transmitting data exists in a base station;

a selecting unit, configured to, if the detecting unit detects that the radio bearer exists, select, from the first user equipment and the other user equipment except the first user equipment, at least one user equipment that transmits the downlink data; and a sending unit, configured to send, through a specified radio bearer corresponding to the at least one user equipment that is selected by the selecting unit, the downlink data received by the receiving unit, where the specified radio bearer is a radio bearer used in the at least one user equipment for assisting the first user equipment or the first system bearer in transmitting data, and includes a radio bearer of the first user equipment or a radio bearer of the first system bearer.

In one aspect, a user equipment is provided and includes:

a receiving unit, configured to receive, through a first radio bearer of the user equipment, downlink data sent by a base station;

a storing unit, configured to, after the receiving unit receives the downlink data, store information of short distance communication between the user equipment and other user equipment; and a sending unit, configured to send, according to the information of short distance communication between the user equipment and other user equipment that is stored by the storing unit, the downlink data received by the receiving unit to the other user equipment, where the first radio bearer is a radio bearer of the user equipment that assists the other user equipment or a first system bearer of the other user equipment in transmitting data.

In one aspect, other user equipment is provided and includes:

a receiving unit, configured to receive, through a first short distance communication bearer, downlink data sent by other user equipment;

a storing unit, configured to store first short distance communication bearer information; and a processing unit, configured to process, at a composition layer, according to the first short distance communication bearer information stored by the storing unit, the downlink data received by the receiving unit, where the first short distance communication bearer is a short distance communication bearer of the other user equipment that assists the user equipment or a first system bearer of the user equipment in transmitting data; and the composition layer is a new functional layer established because the other user equipment except the user equipment assists the user equipment or the first system bearer of the user equipment in transmitting data.

In one aspect, another apparatus used for communication is provided and includes: a receiving unit, configured to receive uplink data which is sent, through a first radio bearer, by a first user equipment;

a confirming unit, configured to, after the receiving unit receives the uplink data, check, according to a context of the first user equipment stored apparatus used for communication, whether the first radio bearer is a radio bearer that assists a second user equipment except the first user equipment or a first system bearer of a second user equipment except the first user equipment in transmitting data; and a sending unit, configured to, when the confirming unit confirms that the radio bearer exists, send the uplink data to an uplink node through a system bearer of the second user equipment or the first system bearer of the second user equipment.

In one aspect, another user equipment is provided and includes:

a receiving unit, configured to receive, through a first short distance communication bearer, uplink data sent by other user equipment;

a storing unit, configured to store information of short distance communication between the user equipment and the other user equipment; and a sending unit, configured to send, according to the information of short distance communication stored by the storing unit, the uplink data received by the receiving unit to a base station, where the first short distance communication bearer is a short distance communication bearer which is of the user equipment and is used for assisting the other user equipment or a first system bearer of the other user equipment in transmitting data.

In one aspect, other user equipment is provided and includes:

a confirming unit, configured to confirm that one user equipment in the user equipment needs to transmit uplink data through a first system bearer of the one user equipment;

a detecting unit, configured to detect, according to a context stored by the one user equipment, whether a short distance communication bearer which is of other user equipment except the one user equipment in the user equipment and is used for assisting the one user equipment or the first system bearer in transmitting data exists in the one user equipment;

a determining unit, configured to, when the detecting unit detects the short distance communication bearer, determine, in the one user equipment and the other user equipment, a user equipment suitable for transmitting the uplink data; and a sending unit, configured to, when the user equipment determined by the determining unit is the one user equipment, send the uplink data to a base station through a radio bearer of the first system bearer of the one user equipment; or configured to, when the user equipment determined by the determining unit is at least one user equipment in the other user equipment, send the uplink data to the at least one user equipment through a short distance communication bearer between the one user equipment and the at least one user equipment.

In one aspect, a communication system is provided and includes the base station according to claims 14 and 15, the user equipment according to claims 16 and 17 and the user equipment according to claims 18 and 19.

In one aspect, another communication system is provided and includes the base station according to claims 20 and 21, the user equipment according to claims 23 and 24 and the user equipment according to claims 25 and 26.

In one aspect, another communication system is provided and includes the base station according to claims 14 and 15, the user equipment according to claims 16 and 17, the user equipment according to claims 18 and 19, the base station according to claims 20 to 21, the user equipment according to claims 23 and 24 and the user equipment according to claims 25 and 26.

It can be seen from the foregoing description that, according to the technical solutions provided by the embodiments of the present invention, a base station and a first user equipment use one or more user equipments which are suitable for transmitting data and are in user equipments including other user equipment and the first user equipment to transmit uplink data or downlink data of the first user equipment. In this way, through mutual assistance between multiple UEs, even though a radio environment of a source UE/destination UE deteriorates, other UE may be selected to assist the source UE/destination UE, which is similar to that the source UE/destination UE always has a radio environment of a UE with a best radio environment among the multiple UEs, thereby, relative to the prior art, improving a throughput rate and/or reliability of data transmission of a user equipment.

Moreover, a probability that radio environments of multiple UEs deteriorate simultaneously is much smaller than a probability that a radio environment of a single UE deteriorates. In this way, system reliability is greatly improved.

BRIEF DESCRIPTION OF THE DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and a person of ordinary skill in the art may still derive other drawings according to these accompanying drawings without creative efforts.

FIG. 1 is a schematic architecture diagram of an SAE/LTE network according to an embodiment of the present invention;

FIG. 1*a* is a flowchart of a communication method according to an embodiment of the present invention;

FIG. 1*b* is a flowchart of a communication method according to another embodiment of the present invention;

FIG. 1*c* is a flowchart of a communication method according to another embodiment of the present invention;

FIG. 2*a* is a flowchart of a communication method according to another embodiment of the present invention;

FIG. 2*b* is a flowchart of a communication method according to another embodiment of the present invention;

FIG. 2*c* is a flowchart of a communication method according to another embodiment of the present invention;

DETAILED DESCRIPTION

Figure 3:
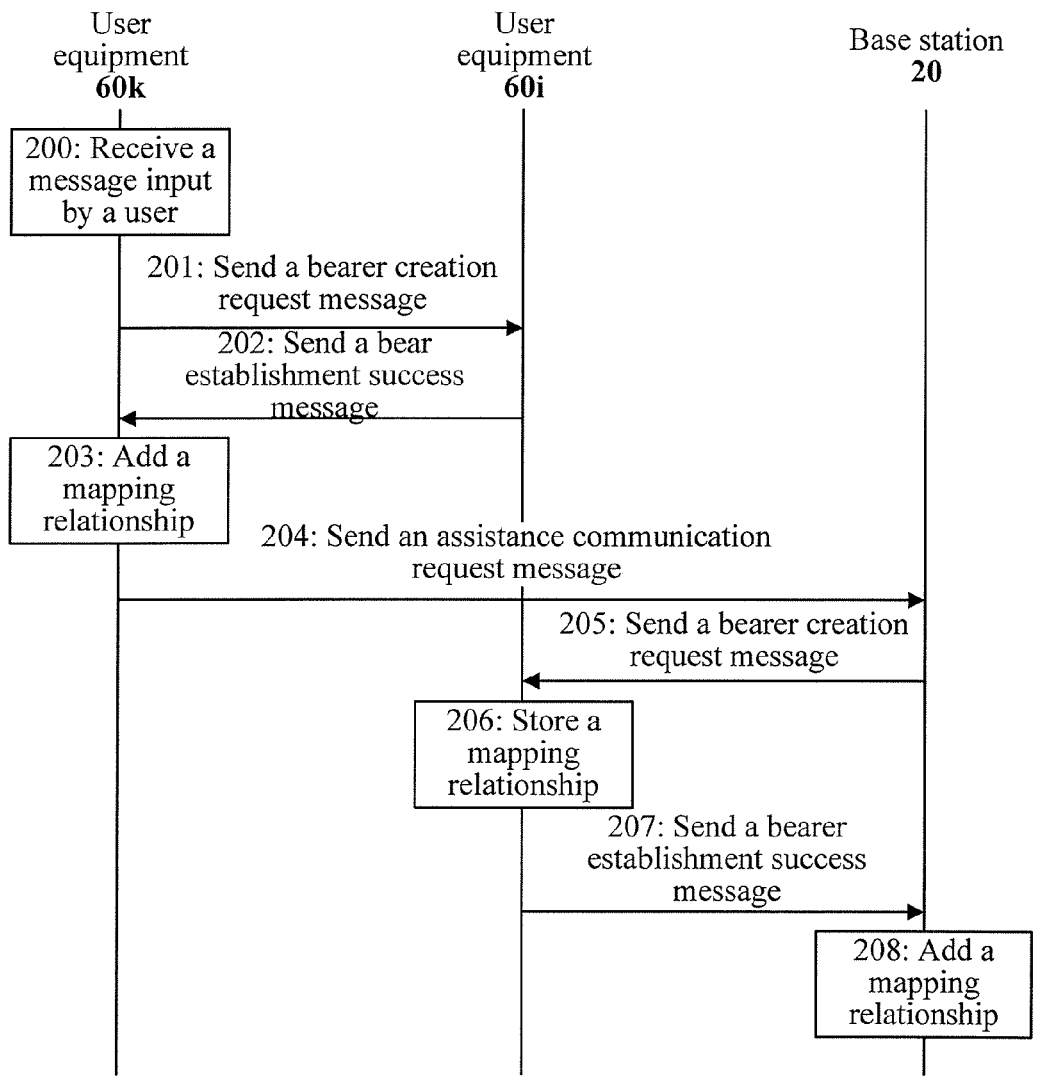
FIG. 3 is a flowchart of a communication method according to another embodiment of the present invention.

To make the objectives, technical solutions, and advantages of the present invention more comprehensible, the following further describes the present invention in detail with reference to the accompanying drawings. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

The following takes a system architecture evolution (SAE) /long-term evolution (LTE) network as an example for description, and the present invention is not limited to the scenario.

FIG. 1 is a schematic architecture diagram of an SAE/LTE network according to an embodiment of the present invention. As shown in FIG. 1, an SAE/LTE network 10 may include a base station (such as an eNodeB) 20, a mobility management entity (MME) 30, a server gateway (S-GW) 40 and a packet data network gateway (P-GW) 50.

The base station 20 is configured to provide an air interface for a user equipment 60, so that the user equipment 60 accesses the SAE/LTE network 10. The mobility management entity 30 is a control plane entity, is responsible for a core network control function of the SAE/LTE network 10, and is configured to execute mobile management and session management of the user equipment 60. The service gateway 40 and the packet data network gateway 50 may be user plane entities, and configured to provide a data transmission service for the user equipment 60.

After the user equipment 60 starts up and is attached to the SAE/LTE network 10, the packet data network gateway 50 establishes one or more evolved packet system (EPS) bearers as a system bearer for the user equipment 60, so that the user equipment 60 may perform communication with a third party 70 through the established EPS bearer, where the third party 70 may be other user equipment, a server of a content provider or a server of a service provider. Each EPS bearer may include a radio bearer between the user equipment 60 and the base station 20, an S1 bearer which is between the base station 20 and the service gateway 40 and is used in the user equipment 60 and an S5/S8 bearer which is between the service gateway 40 and the packet data network gateway 50 and is used in the user equipment 60. The S1 bearer is also referred to as a bearer between a radio access network and a core network of the SAE/LTE network 10.

An air-interface protocol stack of the radio bearer of the EPS bearer includes a physical (PHY) layer, a media access control (MAC) layer, a radio link control (RLC) layer, a packet data convergence protocol (PDCP) layer and a composition layer. The PHY layer, the MAC layer, the RLC layer and the PDCP layer are existing protocol layers, but the composition layer is a newly-added protocol layer located above the PDCP layer in this embodiment. Operations to be executed by the user equipment 60 and the base station 20 at the composition layer are described in detail subsequently.

The user equipment 60 has a capability of short distance communication based on a long-term evolution device to device (LTE-D2D) technology. When a distance between any two user equipments 60 is within a range in which short distance communication can be performed, the two user equipments 60 may use the LTE-D2D technology to establish a short distance communication bearer to perform short distance communication.

FIG. 1*a* is a flowchart of a communication method according to an embodiment of the present invention, and the method includes:

101*a*: When a base station receives downlink data through a first system bearer of a first user equipment, the base station detects, according to a context of the first user equipment stored by the base station itself, whether a radio bearer which is of other user equipment except the first user equipment and assists the first user equipment or the first system bearer in transmitting data exists in the base station.

102*a*: If the radio bearer exists, the base station selects, from the first user equipment and the other user equipment except the first user equipment, at least one user equipment that transmits the downlink data.

103*a*: The base station sends the downlink data through a specified radio bearer corresponding to the at least one user equipment, where the specified radio bearer is a radio bearer which is in the base station and is used in the at least one user equipment for assisting the first user equipment or the first system bearer in transmitting data, and includes a radio bearer of the first user equipment or a radio bearer of the first system bearer.

It can be seen from the foregoing description that, according to the technical solution provided by the embodiment of the present invention, a base station and a first user equipment use one or more user equipments which are suitable for transmitting data and are in user equipments including other user equipment and the first user equipment to transmit uplink data or downlink data of the first user equipment. In this way, through mutual assistance between multiple UEs, even though a radio environment of a source UE/destination UE deteriorates, other UE may be selected to assist the source UE/destination UE, which is similar to that the source UE/destination UE always has a radio environment of a UE with a best radio environment among the multiple UEs, thereby, relative to the prior art, improving a throughput rate and/or reliability of data transmission of a user equipment.

That the base station selects, from the first user equipment and the other user equipment except the first user equipment, at least one user equipment that transmits the downlink data includes:

selecting, by the base station, from the first user equipment and the other user equipment except the first user equipment, a user equipment in a best radio link condition.

FIG. 1*b* is a flowchart of a communication method according to an embodiment of the present invention, and the method includes:

101*b*: A first user equipment receives, through a first radio bearer of the first user equipment, downlink data sent by a base station.

102*b*: Send the downlink data to a second user equipment according to stored information of short distance communication with the second user equipment.

The first radio bearer is a radio bearer of the first user equipment that assists the second user equipment or a first system bearer of the second user equipment in transmitting data.

It can be seen from the foregoing description that, according to the technical solution provided by the embodiment of the present invention, a base station and a first user equipment use one or more user equipments which are suitable for transmitting data and are in user equipments including other user equipment and the first user equipment to transmit uplink data or downlink data of the first user equipment. In this way, through mutual assistance between multiple UEs, even though a radio environment of a source UE/destination UE deteriorates, other UE may be selected to assist the source UE/destination UE, which is similar to that the source UE/destination UE always has a radio environment of a UE with a best radio environment among the multiple UEs, thereby, relative to the prior art, improving a throughput rate and/or reliability of data transmission of a user equipment.

The stored information of short distance communication with the second user equipment includes:

a mapping relationship stored by the first user equipment, where the mapping relationship includes a mapping relationship between a first short distance communication bearer and the first radio bearer, where the first short distance communication bearer is a short distance communication bearer which is established by the first user equipment and is used for assisting the second user equipment or the first system bearer of the second user equipment in transmitting data.

FIG. 1*c* is a flowchart of a communication method according to an embodiment of the present invention, and the method includes:

101*c*: A first user equipment receives, through a first short distance communication bearer, downlink data sent by a second user equipment.

102*c*: Process the downlink data at a composition layer according to first short distance communication bearer information stored by the first user equipment.

It can be seen from the foregoing description that, according to the technical solution provided by the embodiment of the present invention, a base station and a first user equipment use one or more user equipments which are suitable for transmitting data and are in user equipments including other user equipment and the first user equipment to transmit uplink data or downlink data of the first user equipment. In this way, through mutual assistance between multiple UEs, even though a radio environment of a source UE/destination UE deteriorates, other UE may be selected to assist the source UE/destination UE, which is similar to that the source UE/destination UE always has a radio environment of a UE with a best radio environment among the multiple UEs, thereby, relative to the prior art, improving a throughput rate and/or reliability of data transmission of a user equipment.

The first short distance communication bearer is a short distance communication bearer of the second user equipment that assists the first user equipment or a first system bearer of the first user equipment in transmitting data.

The composition layer is a new functional layer established because other user equipment except the first user equipment assists the first user equipment or the first system bearer of the first user equipment in transmitting data.

The processing the downlink data at a composition layer includes:

performing combination processing on the downlink data sent by the second user equipment and received through the first short distance communication bearer and downlink data received through a radio bearer of the first system bearer of the first user equipment.

FIG. 2a is a flowchart of a communication method according to an embodiment of the present invention, and the method includes:

201a: When a base station receives uplink data which is sent, through a first radio bearer, by a first user equipment, check, according to a context of the first user equipment stored by the base station, whether the first radio bearer is a radio bearer that assists a second user equipment except the first user equipment or a first system bearer of a second user equipment except the first user equipment in transmitting data.

202a: When a checking result is positive, the base station sends the uplink data to an uplink node through a system bearer of the second user equipment or the first system bearer of the second user equipment.

It can be seen from the foregoing description that, according to the technical solution provided by the embodiment of the present invention, a base station and a first user equipment use one or more user equipments which are suitable for transmitting data and are in user equipments including other user equipment and the first user equipment to transmit uplink data or downlink data of the first user equipment. In this way, through mutual assistance between multiple UEs, even though a radio environment of a source UE/destination UE deteriorates, other UE may be selected to assist the source UE/destination UE, which is similar to that the source UE/destination UE always has a radio environment of a UE with a best radio environment among the multiple UEs, thereby, relative to the prior art, improving a throughput rate and/or reliability of data transmission of a user equipment.

Further, the method further includes:

when the base station receives uplink data which is sent, through a second radio bearer, by the second user equipment, checking, according to a context of the second user equipment stored by the base station, whether the second radio bearer is a radio bearer that assists other user equipment except the second user equipment or a system bearer of other user equipment except the second user equipment in transmitting data; and when a checking result is negative, sending, by the base station, the uplink data to the uplink node through the system bearer of the second user equipment or the first system bearer of the second user equipment.

Before the sending, by the base station, the uplink data to an uplink node through a system bearer of the second user equipment or the first system bearer of the second user equipment, the method further includes:

performing, by the base station, at a composition layer, combination processing on the uplink data, where the composition layer is a new functional layer established because the other user equipment except the second user equipment assists the second user equipment or the first system bearer of the second user equipment in transmitting data.

FIG. 2b is a flowchart of a communication method according to an embodiment of the present invention, and the method includes:

201b: A first user equipment receives, through a first short distance communication bearer, uplink data sent by a second user equipment.

202b: Send the uplink data to a base station according to stored information of short distance communication with the second user equipment.

The first short distance communication bearer is a short distance communication bearer which is in the first user equipment and is used for assisting the second user equipment or a first system bearer of the second user equipment in transmitting data.

It can be seen from the foregoing description that, according to the technical solution provided by the embodiment of the present invention, a base station and a first user equipment use one or more user equipments which are suitable for transmitting data and are in user equipments including other user equipment and the first user equipment to transmit uplink data or downlink data of the first user equipment. In this way, through mutual assistance between multiple UEs, even though a radio environment of a source UE/destination UE deteriorates, other UE may be selected to assist the source UE/destination UE, which is similar to that the source UE/destination TIE always has a radio environment of a UE with a best radio environment among the multiple UEs, thereby, relative to the prior art, improving a throughput rate and/or reliability of data transmission of a user equipment.

The stored information of short distance communication with the second user equipment includes:

a mapping relationship stored by the first user equipment, where the mapping relationship includes a mapping relationship between the first short distance communication bearer and a first radio bearer, where the first radio bearer is a radio bearer which is established by the first user equipment and is used for assisting the second user equipment or the first system bearer of the second equipment in transmitting data.

FIG. 2c is a flowchart of a communication method according to an embodiment of the present invention, and the method includes:

201c: When a first user equipment in a user equipment needs to transmit uplink data through a first system bearer of the first user equipment, detect, according to a context stored by the first user equipment, whether a short distance communication bearer which is of other user equipment except the first user equipment in the user equipment and is used for assisting the first user equipment or the first system bearer in transmitting data exists in the first user equipment.

202c: When a detection result is positive, determine, in the first user equipment and the other user equipment, a user equipment suitable for transmitting the uplink data.

203c: When the determined user equipment is the first user equipment, send the uplink data to a base station through a radio bearer of the first system bearer of the first user equipment; and when the determined user equipment is at least one user equipment in the other user equipment, send the uplink data to the at least one user equipment through a short distance communication bearer between the first user equipment and the at least one user equipment.

It can be seen from the foregoing description that, according to the technical solution provided by the embodiment of the present invention, a base station and a first user equipment use one or more user equipments which are suitable for transmitting data and are in user equipments including other user equipment and the first user equipment to transmit uplink data or downlink data of the first user equipment. In this way, through mutual assistance between multiple UEs, even though a radio environment of a source UE/destination UE deteriorates, other UE may be selected to assist the source UE/destination UE, which is similar to that the source UE/destination UE always has a radio environment of a UE with a best radio environment among the multiple UEs, thereby, relative to the prior art, improving a throughput rate and/or reliability of data transmission of a user equipment.

The determining, in the first user equipment and the other user equipment, a user equipment suitable for transmitting the uplink data includes:

determining, in the first user equipment and the other user equipment, a user equipment in a best radio link condition that transmits the uplink data to the base station.

FIG. 2 is a flowchart of a method for setting a user equipment to assist data transmission according to an embodiment of the present invention. This embodiment describes a process of how to set a user equipment to be used for assisting one EPS bearer of other user equipment in transmitting data. In this embodiment, that an assisted user equipment initiates a process of establishing a short distance communication bearer is taken as an example for description. For example, a user equipment 60$i$ is set to assist an EPS bearer Ei of a user equipment 60$k$ in transmitting data. As shown in FIG. 2, this embodiment includes:

200: A user equipment 60$k$ receives a message which is input by a user and is used for indicating that a user equipment 60$i$ assists an EPS bearer Ei of the user equipment 60$k$ in transmitting data.

A trigger for the user equipment 60$i$ to assist the EPS bearer Ei of the user equipment 60$k$ in transmitting data may be implemented through an application layer.

201: The user equipment 60$k$ sends a bearer creation request message to the user equipment 60$i$, where the bearer creation request message is used for instructing the user equipment 60$i$ to establish a short distance communication bearer J1 used for assisting the EPS bearer Ei of the user equipment 60$k$ in transmitting data.

202: The user equipment 60$i$ sends an establishment success message of the short distance communication bearer to the user equipment 60$k$.

Through interaction between step 201 and step 202, the short distance communication bearer J1 is established between the user equipment 60$k$ and the user equipment 60$i$, where the J1 is based on an LTE-D2D technology and used by the user equipment 60$i$ for assisting the EPS bearer Ei of the user equipment 60$k$ in transmitting data. A protocol stack of the short distance communication bearer J1 includes a PHY layer, an MAC layer, an RLC layer and a PDCP layer from bottom to top.

203: After receiving the bearer establishment success message from the user equipment 60$i$, the user equipment 60$k$ adds a mapping relationship between the established short distance communication bearer J1 and the EPS bearer Ei in a context of the user equipment 60$k$.

204: After adding the mapping relationship, the user equipment 60$k$ sends an assistance communication request message to a base station 20, where the message is used for indicating that the user equipment 60$i$ may assist the EPS bearer Ei of the user equipment 60$k$ in transmitting data.

205: The base station 20 sends a bearer creation request message to the user equipment 60$i$, where the bearer creation request message is used for instructing the user equipment 60$i$ to establish a radio bearer W1 that assists the EPS bearer Ei of the user equipment 60$k$ in transmitting data.

206: The user equipment 60$i$ stores a mapping relationship, where the mapping relationship is a mapping relationship between the radio bearer W1 that needs to be established and the established short distance communication bearer J1.

207: The user equipment 60$i$ sends a bearer establishment success message to the base station 20.

Through interaction between step 205 and step 207, the radio bearer W1' is established between the user equipment 60$i$ and the base station 20, where the W1 is used by the user equipment 60$i$ for assisting the EPS bearer Ei of the user equipment 60$k$ in transmitting data.

208: After receiving the bearer establishment success message from the user equipment 60$i$, the base station 20 adds a mapping relationship between the radio bearer W1 and the EPS bearer Ei separately in a context of the user equipment 60$k$ and a context of the user equipment 60$i$ stored by the base station 20.

Through the mapping relationship, when the base station 20 receives downlink data of the EPS bearer Ei of the user equipment 60$k$, the base station 20 may select to directly transmit the downlink data of the user equipment 60$k$ to the user equipment 60$k$ through a radio bearer of the EPS bearer Ei of the user equipment 60$k$, or the base station 20 may also select to transmit the downlink data to the user equipment 60$i$ through the radio bearer W1 of the user equipment 60$i$; and then the user equipment 60$i$ sends the downlink data to the user equipment 60$k$ through the mapping relationship which is between the radio bearer W1 and the short distance communication bearer J1 and is saved in the user equipment 60$i$.

Through the mapping relationship, when receiving the uplink data which is of the user equipment 60$k$ and is from the radio bearer W1 of the user equipment 60$i$, the base station 20 may also forward, according to the mapping relationship, uplink data of the user equipment 60$k$ processed by a protocol stack corresponding to the radio bearer W1, to a protocol stack corresponding to the EPS bearer Ei of the user equipment 60$k$ for reprocessing, and send the processed uplink data to a core network node (such as an S-GW) through a bearer (such as an S1 bearer) between a radio access network and a core network in the EPS bearer Ei of the user equipment 60$k$.

Here, a new functional layer, a composition layer, is introduced, and the composition layer is a newly-added protocol layer located above the PDCP layer in this embodiment.

For the downlink data, when receiving the downlink data of the EPS bearer Ei of the user equipment 60$k$ from an S1 interface, the base station 20 performs data distribution through the composition layer, and directly sends the downlink data to the user equipment 60$k$ through the radio bearer of the EPS bearer Ei of the user equipment 60$k$; or transmits the downlink data to the user equipment 60$i$ through the radio bearer W1 of the user equipment 60*i*. Then, the user equipment 60*i* sends the downlink data to the user equipment 60*k* through the short distance communication bearer J1. After receiving the downlink data, the user equipment 60*k* sends the downlink data to the composition layer of the user equipment 60*k*, and performs data combination through the composition layer.

For the uplink data, the user equipment 60*k* performs data distribution through the composition layer, directly sends the uplink data to the base station 20 through the radio bearer of the EPS bearer Ei of the user equipment 60*k*; or transmits the uplink data to the user equipment 60*i* through the short distance communication bearer J1 with the user equipment 60*i*. The user equipment 60*i* then sends the uplink data to the base station 20; and after receiving the uplink data, the base station 20 sends the uplink data to the composition layer of the EPS bearer Ei of the user equipment 60*k*, and performs data combination through the composition layer. Finally, the uplink data is sent to an uplink node.

FIG. 2A is a flowchart of a method for setting a user equipment to assist data transmission according to another embodiment of the present invention. In this embodiment, that a user equipment that assists in transmitting data initiates a process of establishing a short distance communication bearer is taken as an example for description. For example, still, a user equipment 60*i* is set to assist an EPS bearer Ei of a user equipment 60*k* in transmitting data, and this embodiment includes:

201*a*: A user equipment 60*k* receives a message input by a user, where the message is used for indicating that a user equipment 60*i* may assist an EPS bearer Ei of the user equipment 60*k* in transmitting data.

202*a*: The user equipment 60*k* sends an assistance communication request message to a base station 20, where the assistance communication request message is used for indicating that the user equipment 60*i* may assist the EPS bearer Ei of the user equipment 60*k* in transmitting data.

203*a*: The base station 20 sends a bearer creation request message to the user equipment 60*i*, where the message is used for instructing the user equipment 60*i* to establish a radio bearer W2 used for assisting the EPS bearer Ei of the user equipment 60*k* in transmitting data.

204*a*: The user equipment 60*i* sends a bearer creation request message to the user equipment 60*k*, where the bearer creation request message is used for instructing the user equipment 60*k* to establish a short distance communication bearer J2 used for assisting the EPS bearer Ei in transmitting data.

205*a*: The user equipment 60*k* adds a mapping relationship between the established short distance communication bearer J2 and the EPS bearer Ei in a context of the user equipment 60*k*.

206*a*: The user equipment 60*k* sends a bearer establishment success message to the user equipment 60*i*.

Through interaction between step 203*a* and step 206*a*, the short distance communication bearer J2 is established between the user equipment 60*k* and the user equipment 60*i*, where the J2 is based on an LTE-D2D technology and used for assisting the EPS bearer Ei in transmitting data. A protocol stack of the short distance communication bearer J2 includes a PHY layer, an MAC layer, an RLC layer and a PDCP layer from bottom to top.

207*a*: After receiving the bearer establishment success message from the user equipment 60*k*, the user equipment 60*i* adds a mapping relationship in a stored context, where the mapping relationship is a mapping relationship between the established short distance communication bearer J2 and the radio bearer W2 to be established.

208*a*: The user equipment 60*i* sends the bearer establishment success message to the base station 20.

Through interaction between step 203*a* and step 208*a*, the radio bearer W2 is established between the user equipment 60*i* and the base station 20, where the W2 is used for assisting the EPS bearer Ei of the user equipment 60*k* in transmitting data.

209*a*: After receiving the bearer establishment success message from the user equipment 60*i*, the base station 20 adds a mapping relationship between the radio bearer W2 and the EPS bearer Ei separately in a context of the user equipment 60*k* and a context of the user equipment 60*i* stored by the base station 20.

Through the mapping relationship, when the base station 20 receives downlink data of the EPS bearer Ei of the user equipment 60*k*, the base station 20 may select to directly transmit the downlink data of the user equipment 60*k* to the user equipment 60*k* through a radio bearer of the EPS bearer Ei of the user equipment 60*k*, or the base station 20 may also select to transmit the downlink data to the user equipment 60*i* through the radio bearer W2 of the user equipment 60*i*; and then the user equipment 60*i* sends the downlink data to the user equipment 60*k* through the mapping relationship which is between the radio bearer W2 and the short distance communication bearer J2 and is saved in the user equipment 60*i*.

Through the mapping relationship, when receiving uplink data which is of the user equipment 60*k* and is from the radio bearer W2 of the user equipment 60*i*, the base station 20 may also forward, according to the mapping relationship, uplink data processed by a protocol stack corresponding to the radio bearer W2, to a protocol stack (a composition layer) corresponding to the EPS bearer Ei of the user equipment 60*k* for reprocessing, and send the finally processed uplink data of the user equipment 60*k* to a core network node (S-GW) through a bearer (S1 bearer) between a radio access network and a core network in the EPS bearer Ei of the user equipment 60*k*.

FIG. 3 is a flowchart of a method used for communication according to an embodiment of the present invention. That a base station 20 sends downlink data of a user equipment 60*k* is taken as an example for description, and the method includes:

300: After the base station 20 receives downlink data XX from an S1 bearer of an EPS bearer En of a user equipment 60*k*, the base station 20 sends the received downlink data XX to a protocol stack corresponding to a radio bearer of the EPS bearer En.

304: At a composition layer of the protocol stack corresponding to the radio bearer of the EPS bearer En, the base station 20 checks whether a context of a user equipment 60*n* stored by the base station 20 includes a mapping relationship between the EPS bearer En and a radio bearer used in other user equipment except the user equipment 60*n*, so as to determine whether the base station 20 includes a radio bearer used in the other user equipment for assisting the EPS bearer En in transmitting data.

308: When a checking result of step 304 is positive, the base station 20 determines, according to a radio link detection report reported by the other user equipment and the user equipment 60*n*, in the other user equipment and the user equipment 60*n*, a user equipment in a best radio link condition that performs communication with the base station 20.

When the user equipment in a best radio link condition determined in step 308 is the user equipment 60n, the base station 20 sends the downlink data XX in a conventional manner, that is, the base station 20 processes the downlink data XX according to configuration information of the radio bearer of the EPS bearer En, and sends the downlink data XX to the user equipment 60n.

312: When the user equipment in a best radio link condition with the base station 20 determined in step 308 is a user equipment 60p of the other user equipment, the base station 20 sends the downlink data XX to the user equipment 60p through a radio bearer Wp, where the radio bearer Wp may be a radio bearer which is of the user equipment 60p and assists the EPS bearer En of the user equipment 60n in transmitting data.

316: The base station 20 sends the downlink data XX to the user equipment 60p according to configuration information of the radio bearer Wp.

320: The user equipment 60p receives the downlink data XX from the radio bearer Wp.

324: At a composition layer of a protocol stack corresponding to the radio bearer Wp, the user equipment 60p checks whether it stores a mapping relationship between the radio bearer Wp and a short distance communication bearer, so as to determine whether a short distance communication bearer which is mapped with the radio bearer Wp and is used for communication of the other user equipment exists in the user equipment 60p. The user equipment 60p finds, through checking, that a short distance communication bearer Je that is based on an LTE-D2D technology, is mapped with the radio bearer Wp and is used for communication of the user equipment 60n exists.

332: The user equipment 60p sends the downlink data XX to the user equipment 60n through the short distance communication bearer Je according to configuration information of the short distance communication bearer Je.

336: The user equipment 60n receives the downlink data XX from the user equipment 60p through the short distance communication bearer Je, where the Je is a bearer based on the LTE-D2D technology.

340: The user equipment 60n sends the received downlink data XX to the composition layer of the radio bearer of the EPS bearer En of the user equipment 60n, and after processing at the composition layer, sends the downlink data XX to a higher layer.

Through the foregoing manners, a base station always selects a user equipment in a best radio link condition to transmit data, and when the user equipment in a best radio link condition is not a final destination, the user equipment transmits, through a set mapping relationship between short distance communication and a radio bearer, the data to a final destination user equipment through a short distance communication technology. In this way, cellular air-interface performance is improved, and reliability of data transmission is also improved.

Figure 4:
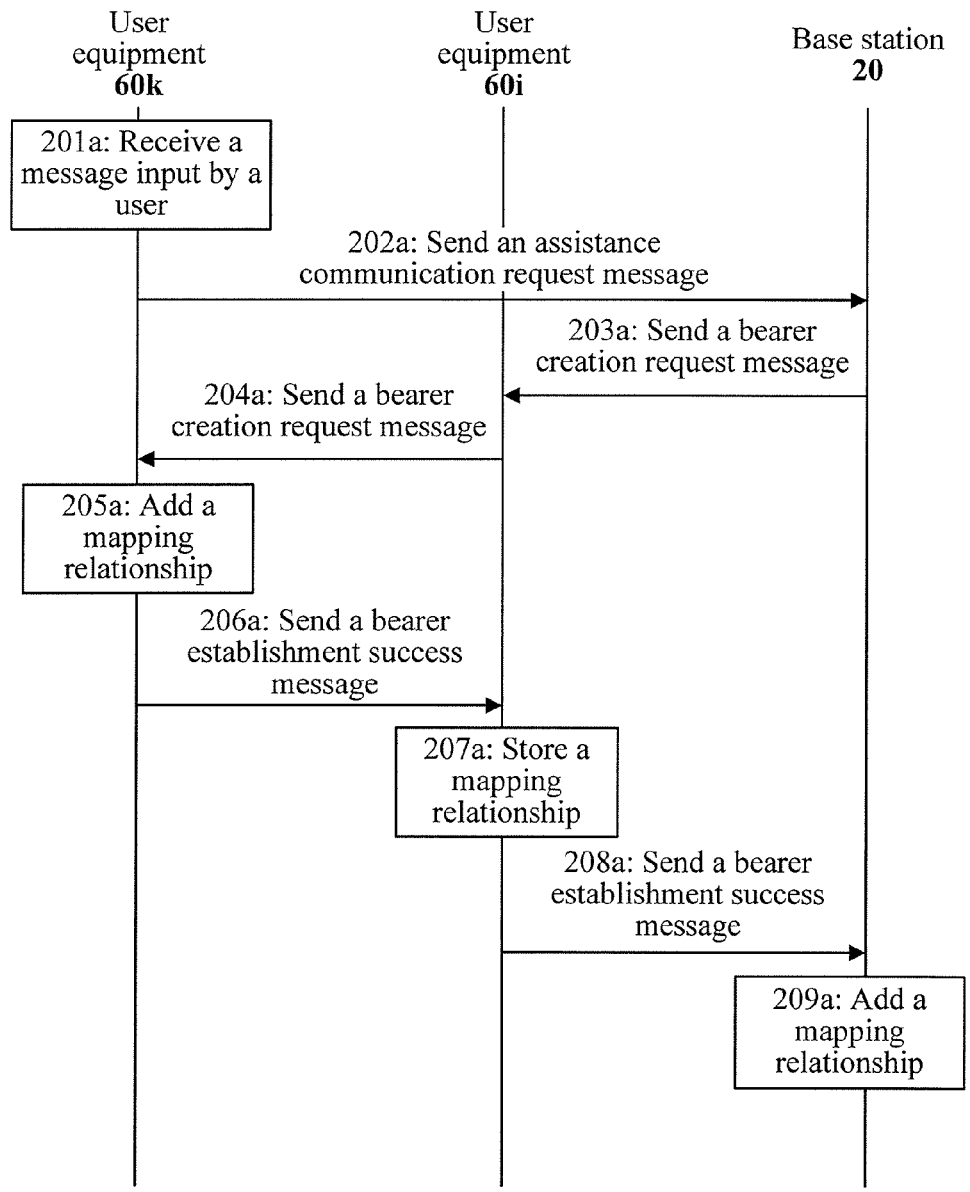
FIG. 4 is a flowchart of a communication method according to another embodiment of the present invention.
Figure 6:
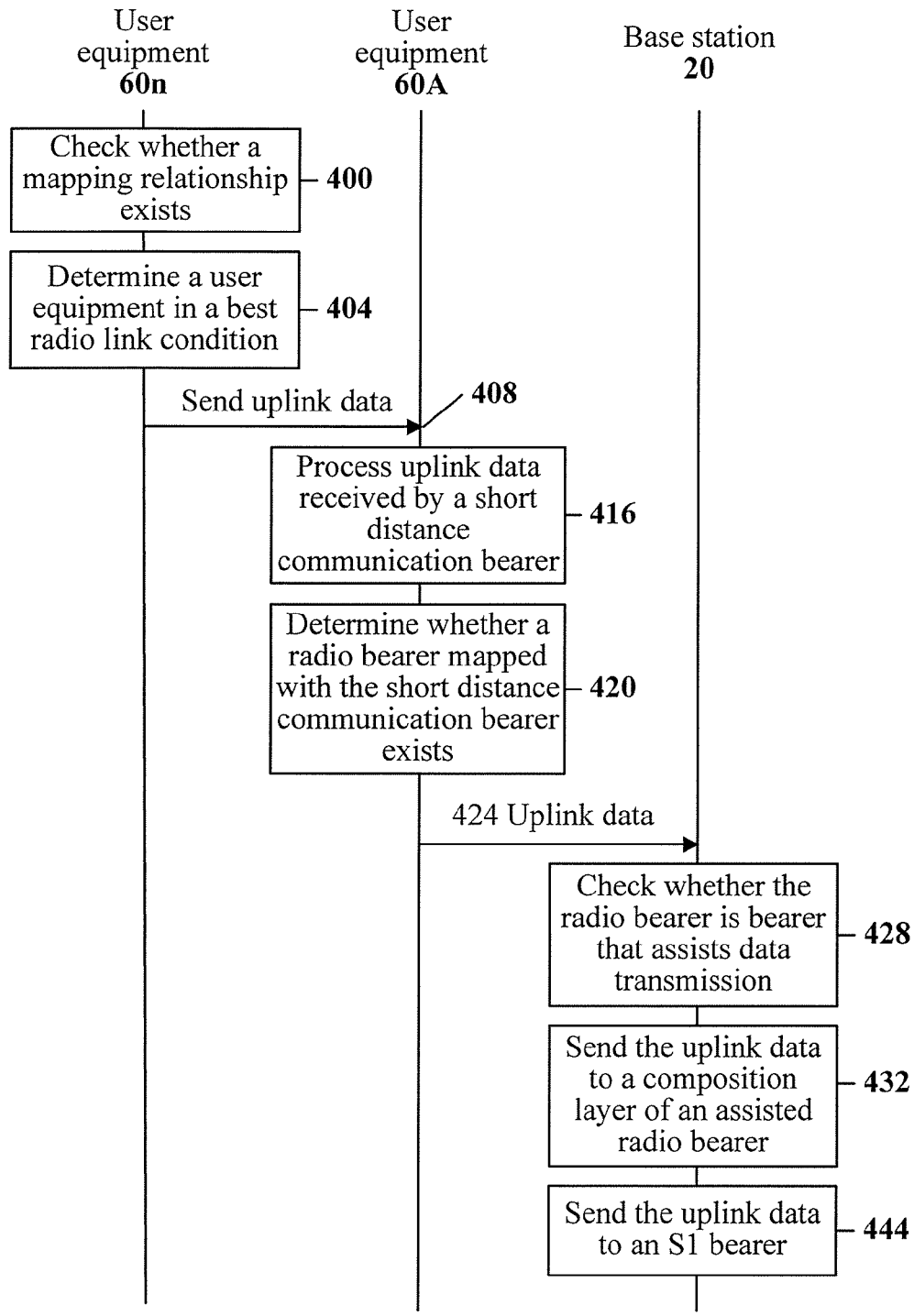
FIG. 6 is a flowchart of a communication method according to another embodiment of the present invention.

FIG. 4 is a flowchart of a method used for communication according to another embodiment of the present invention. An uplink data implementation solution is described in this embodiment, where that a user equipment 60n sends uplink data SX borne on an EPS bearer En of the user equipment 60n to a third party 70 is taken as an example, and the method includes:

400: When a user equipment 60n needs to send uplink data SX to a third party 70 through an EPS bearer En, the user equipment 60n checks and determines whether its context includes a mapping relationship between a short distance communication bearer and the EPS bearer En. Here, the short distance communication bearer is based on an LTE-D2D technology.

404: When a checking result of step 400 is positive, the user equipment 60n determines, according to a detected radio link condition of the user equipment 60n and a base station 20, and a detected radio link condition of other user equipment and the base station 20, in the user equipment 60n and the other user equipment, a user equipment in a best radio link condition that performs communication with the base station 20.

When the user equipment determined in step 404 is the user equipment 60n, the user equipment 60n sends the uplink data SX in a conventional manner, and after processing of a composition layer of a radio bearer of the EPS bearer En, the base station 20 sends the processed uplink data SX to an S1 bearer of the EPS bearer En, so as to send the uplink data SX to the third party 70 through the EPS bearer En.

408: When the user equipment determined in step 404 is one user equipment 60A of the other user equipment, on the composition layer of the radio bearer of the EPS bearer En, the user equipment 60n sends the uplink data SX to the user equipment 60A through a short distance communication bearer Ja, where the Ja is a short distance communication bearer which is between the user equipment 60A and the user equipment 60n and is established by the user equipment 60A for assisting the EPS bearer En of the user equipment 60n in transmitting data.

416: The user equipment 60A receives the uplink data SX.

420: The user equipment 60A checks and determines whether it stores a mapping relationship between the short distance communication bearer Ja and the radio bearer. Here, the user equipment 60A finds, through checking, that a radio bearer Wa which is mapped with the short distance communication bearer Ja and is used for assisting the EPS bearer En in transmitting data exists, where the Wa is a radio bearer used in the user equipment 60A for assisting the EPS bearer En of the user equipment 60n in transmitting data.

424: The user equipment 60A sends the uplink data SX to the base station 20 through the radio bearer Wa.

428: The base station 20 checks whether a context of the user equipment 60A stored by the base station 20 includes a mapping relationship between the radio bearer Wa and another EPS bearer, so as to determine whether the radio bearer Wa is a bearer that assists an EPS bearer of other user equipment in transmitting data. Here, the base station 20 finds, through checking, that the radio bearer Wa is a radio bearer that assists the EPS bearer En of the user equipment 60n in transmitting data.

432: The base station 20 sends the uplink data SX from the radio bearer Wa to a composition layer of a protocol stack corresponding to the radio bearer of the EPS bearer En.

444: At the composition layer of the radio bearer of the EPS bearer En, the base station 20 sends the processed uplink data SX to an S1 bearer of the EPS bearer En, so as to send the uplink data SX to the third party 70 through the EPS bearer En.

Through the foregoing manners, a user equipment in a best radio link condition may also be selected to transmit data. When the user equipment in a best radio link condition is not a source user equipment, the source user equipment transmits, through a set mapping relationship between short distance communication and a radio bearer, data to an assisting user equipment through a short distance communication technology, the assisting user equipment transmits the data to a base station through a set mapping relationship between short distance communication and a radio bearer, and then the base station transmits, according to a set mapping relationship of a radio bearer, uplink data to an EPS bearer of the source user equipment, and to a third party. In this way, cellular air-interface performance is improved, and reliability of data transmission is also improved.

A person skilled in the art should understand that, although in the foregoing embodiments, an EPS bearer is used as a granularity to specify an object needing data transmission assistance, the present invention is not limited thereto. In some other embodiments of the present invention, a user equipment may be used as a granularity to specify an object needing data transmission assistance. In this case, all EPS bearers of the user equipment may assist data transmission.

In a case that the user equipment is used as the granularity to specify an object needing data transmission assistance, each EPS bearer transmits data with a specified network address and port number, and therefore, a base station 20 and a user equipment 60 may determine, according to a network address and a port number included in uplink data and downlink data, an EPS bearer corresponding to the uplink data and the downlink data.

A person skilled in the art should understand that, although in the foregoing embodiments, a newly-added composition layer is located above a PDCP layer of a protocol stack of a radio bearer, the present invention is not limited thereto. In some other embodiments of the present invention, a newly-added composition layer may also not be located above a PDCP layer, but located between a PHY layer and an MAC layer, between an MAC layer and an RLC layer, or between an RLC layer and the PDCP layer, or a newly-added composition layer is located in a PHY layer, an MAC layer, an RLC layer or a PDCP layer as a sublayer.

In a case that the newly-added composition layer is not located above the PDCP layer, if uplink data or downlink data needs to be transmitted through a user equipment used for assisting data transmission, only processing of part of protocol layers is performed on the uplink data or downlink data in each radio bearer through which the uplink data or downlink data is transmitted. Taking that the newly-added composition layer is located between the MAC layer and the RLC layer as an example, when it is determined that downlink data Di that is to be transmitted to a user equipment Ui and is received, from an EPS bearer Ti of the user equipment Ui, by a base station 20 is transmitted to the user equipment Ui through other user equipment Uk, the base station 20 first performs PDCP layer processing and RLC layer processing on the downlink data Di according to configuration information of a radio bearer of the EPS bearer Ti. Next, at a composition layer of the radio bearer of the EPS bearer Ti, the base station 20 performs distribution on the downlink data Di, namely, distributes the downlink data Di to the other user equipment Uk, then executes, according to configuration information of a radio bearer which is in the base station 20 and is used in the user equipment Uk for assisting the user equipment Ui or the EPS bearer Ti in transmitting data, MAC layer processing and PHY layer processing on the downlink data Di after the RLC layer processing, and then sends the downlink data Di to the user equipment Uk. After receiving the downlink data Di from the base station 20, the user equipment Uk first performs PHY layer processing and MAC layer processing on the downlink data Di according to configuration information of a radio bearer receiving the downlink data Di, may further perform composition layer processing, and then sends the downlink data Di after the MAC layer or composition layer processing to the user equipment Ui through a short distance communication bearer. After receiving the downlink data Di from the user equipment Uk, the user equipment Ui performs RLC layer processing and PDCP layer processing (or executes composition layer processing, RLC layer processing and PDCP layer processing) on the downlink data Di according to the configuration information of the radio bearer of the EPS bearer Ti, and then sends the downlink data Di after the PDCP layer processing to a corresponding high-level application. Processing of uplink data is similar to that of the downlink data, and is not repeatedly described herein.

A person skilled in the art should understand that, although in the foregoing embodiments, only when a user equipment receives a message which is input by a user and is used for indicating that other user equipment assists the user equipment or a specified EPS bearer of the user equipment in transmitting data, a process of setting a user equipment to assist data transmission is started, the present invention is not limited thereto.

In some other embodiments of the present invention, for example, it may also be that when a base station 20 receives used for indicating that a user equipment becomes able to perform short distance communication with other user equipment, or when a base station 20 uses a positioning technology to detect and find that a distance between a user equipment and other user equipment is within a range in which short distance communication can be performed, a procedure for setting a user equipment to assist data transmission is started.

Specifically, when any user equipment Ri monitors and finds that it becomes able to perform short distance communication with a user equipment A, the user equipment Ri sends, to a base station 20, a message used for indicating that the user equipment Ri becomes able to perform short distance communication with the user equipment A. After receiving, from the user equipment Ri, the message used for indicating that the user equipment Ri becomes able to perform short distance communication with the user equipment A or when the base station 20 uses a positioning technology to detect and find that a distance between the user equipment Ri and the user equipment A is within a range in which short distance communication can be performed, the base station 20 establishes a radio bearer used in the user equipment Ri for assisting the user equipment A in transmitting data, or establishes a radio bearer used in the user equipment A for specifying an EPS bearer ZD to transmit data, and the base station 20 sends, to the user equipment A, a message used for indicating that the user equipment Ri may assist the user equipment A in transmitting data, or the base station 20 sends, to the user equipment A, a message used for specifying an EPS bearer ZD to transmit data. After receiving, from the base station, the message used for indicating that the user equipment Ri may assist the user equipment A or specifying the EPS bearer ZD to transmit data, the user equipment A establishes a short distance communication bearer which is used for performing communication with the user equipment Ri and assists the user equipment A in transmitting data or specifies the EPS bearer ZD to transmit data, and sends, to the user equipment Ri, a message used for instructing the user equipment Ri to establish a short distance communication bearer for assisting the user equipment A in transmitting data or specifying the EPS bearer ZD to transmit data. After receiving, from the user equipment A, the message used for instructing the user equipment Ri to establish a short distance communication bearer for assisting the user equipment A in transmitting data or specifying the EPS bearer ZD to transmit data, the user equipment Ri establishes a short distance communication bearer which is used for performing communication with the user equipment A and assists the user equipment A in transmitting data or specifies the EPS bearer ZD to transmit data, and sends a bearer establishment success message to the user equipment A. After receiving the bearer establishment success message from the user equipment Ri, the user equipment A stores a mapping relationship between the user equipment A or the specified EPS bearer ZD and the established short distance communication bearer in a context of the user equipment A. After that, the base station 20 sends, to the user equipment Ri, a message used for instructing the user equipment Ri to establish a radio bearer for assisting the user equipment A in transmitting data or specifying the EPS bearer ZD to transmit data. After receiving, from the base station, the message used for instructing the user equipment Ri to establish a radio bearer for assisting the user equipment A in transmitting data or specifying the EPS bearer ZD to transmit data, the user equipment Ri establishes a radio bearer for assisting the user equipment A in transmitting data or specifying the EPS bearer ZD to transmit data, stores a mapping relationship between the established radio bearer and the previously established short distance communication bearer which is used for performing communication with the user equipment A and assists the user equipment A in transmitting data or specifies the EPS bearer ZD to transmit data, and then sends a bearer establishment success message to the base station 20. After receiving the bearer establishment success message from the user equipment Ri, the base station 20 adds, in a context of the user equipment A and a context of the user equipment Ri stored by the base station 20, a mapping relationship between the user equipment A or the specified EPS bearer ZD and the established radio bearer used in the user equipment Ri for assisting the user equipment A in transmitting data or specifying the EPS bearer ZD to transmit data.

A person skilled in the art should understand that, although in the foregoing embodiment, a user equipment initiating a process of establishing a short distance communication bearer is the assisted user equipment A in data transmission, the present invention is not limited thereto. In some other embodiments of the present invention, as shown in FIG. 2B, a user equipment initiating a process of establishing a short distance communication bearer may also be the user equipment Ri that assists data transmission.

A person skilled in the art should understand that, although in the foregoing embodiments, the disclosed solutions are used in an SAE/LTE network, the present invention is not limited thereto. In some other embodiments of the present invention, the disclosed solutions may also be used in another mobile communication system, for example, a general packet radio service (GPRS) system. In a case of the GPRS system, a packet data protocol (PDP) context is a system bearer.

A person skilled in the art should understand that, although in the foregoing embodiments, each user equipment 60 uses an LTE-D2D technology to perform short distance communication, the present invention is not limited thereto. In some other embodiments of the present invention, each user equipment 60 may also use another short distance communication technology, such as a bluetooth communication technology, a wireless fidelity (WiFi) communication technology or an infrared communication technology, to perform short distance communication. When the other short distance communication technology is used to perform short distance communication, a bearer or protocol corresponding to the other short distance communication technology is used for performing data transmission processing. In addition, when these short distance communication technologies are used, using another transfer device is not limited between user equipments, such as an AP (Access Point, access point) of WiFi.

A person skilled in the art should understand that, although in the foregoing embodiments, a determined user equipment suitable for transmitting uplink data or downlink data is a user equipment in a best radio link condition with a base station, the present invention is not limited thereto. In some other embodiments of the present invention, a determined user equipment suitable for transmitting uplink data or downlink data may also be multiple user equipments. In this case, the multiple user equipments separately transmit at least one part of the uplink data or downlink data, and data respectively transmitted by the multiple user equipments may be different from each other, partly the same or totally different. Moreover, when a base station 20 determines a user equipment suitable for transmitting uplink data or downlink data, it may be scheduling based on each scheduling unit (such as 5 radio resource blocks, Resource Block), or based on a long-time granularity.

Figure 5:
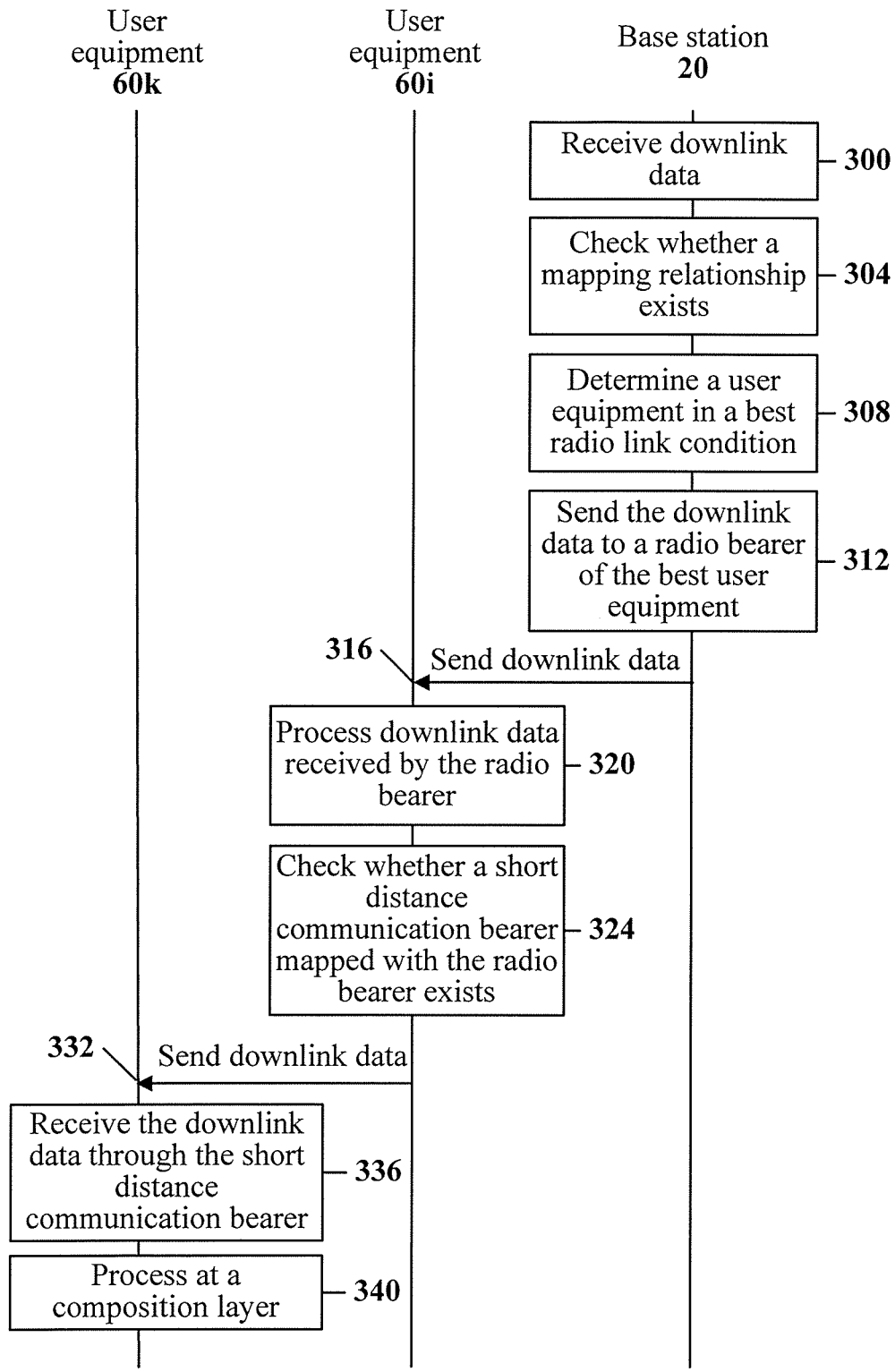
FIG. 5 is a flowchart of a communication method according to another embodiment of the present invention.
Figure 5A:
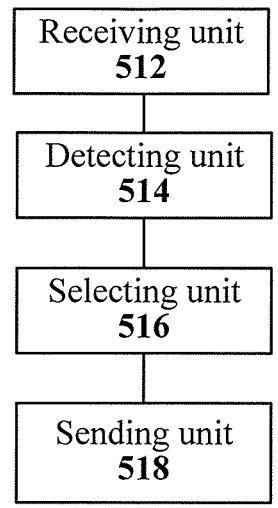
FIG. 5A is a flowchart of a communication apparatus according to an embodiment of the present invention.

FIG. 5A is a flowchart of a communication apparatus according to an embodiment of the present invention, where the communication apparatus includes:

a receiving unit 512, configured to receive downlink data through a first system bearer of a first user equipment;

a detecting unit 514, configured to, after the receiving unit receives the downlink data, detect, according to a context of the first user equipment stored apparatus used for communication, whether a radio bearer which is of other user equipment except the first user equipment and assists the first user equipment or the first system bearer in transmitting data exists in a base station;

a selecting unit 516, configured to, if the detecting unit detects that the radio bearer exists, select, from the first user equipment and the other user equipment except the first user equipment, at least one user equipment that transmits the downlink data; and a sending unit 518, configured to send, through a specified radio bearer corresponding to the at least one user equipment that is selected by the selecting unit, the downlink data received by the receiving unit, where the specified radio bearer is a radio bearer used in the at least one user equipment for assisting the first user equipment or the first system bearer in transmitting data, and includes a radio bearer of the first user equipment or a radio bearer of the first system bearer.

The selecting unit is specifically configured to:

select, from the first user equipment and the other user equipment except the first user equipment, a user equipment in a best radio link condition.

Figure 5B:
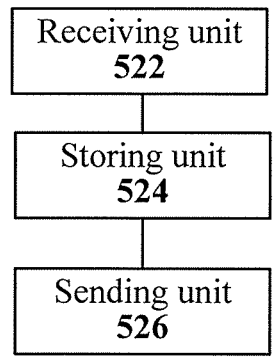
FIG. 5B is a flowchart of a user equipment according to an embodiment of the present invention.

FIG. 5B is a flowchart of a user equipment according to an embodiment of the present invention, where the apparatus shown in FIG. 5B may be implemented by using software, hardware or in a manner of combining software and hardware, and may be installed in a base station 20 of a mobile communication system.

A receiving unit 522 is configured to receive, through a first radio bearer of the user equipment, downlink data sent by a base station;

a storing unit 524 is configured to, after the receiving unit receives the downlink data, store information of short distance communication between the user equipment and other user equipment; and a sending unit 526 is configured to send, according to the information of short distance communication between the user equipment and other user equipment that is stored by the storing unit, the downlink data received by the receiving unit to the other user equipment, where the first radio bearer is a radio bearer of the user equipment that assists the other user equipment or a first system bearer of the other user equipment in transmitting data.

The storing unit is specifically configured to:

store a mapping relationship between a first short distance communication bearer and the first radio bearer, where the first short distance communication bearer is a short distance communication bearer which is established by the user equipment and is used for assisting the other user equipment or the first system bearer of the other user equipment in transmitting data.

Figure 5C:
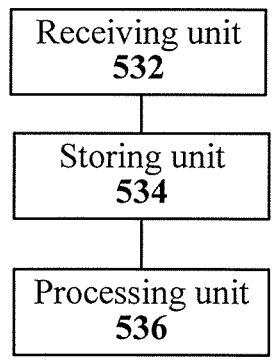
FIG. 5C is a flowchart of another user equipment according to an embodiment of the present invention.

FIG. 5C is a flowchart of another user equipment according to an embodiment of the present invention, where the user equipment includes:

a receiving unit 532, configured to receive, through a first short distance communication bearer, downlink data sent by other user equipment;

a storing unit 534, configured to store first short distance communication bearer information; and a processing unit 536, configured to process, at a composition layer, according to the first short distance communication bearer information stored by the storing unit, the downlink data received by the receiving unit, where the first short distance communication bearer is a short distance communication bearer of the other user equipment that assists the user equipment or a first system bearer of the user equipment in transmitting data; and the composition layer is a new functional layer established because the other user equipment except the user equipment assists the user equipment or the first system bearer of the user equipment in transmitting data.

The processing unit is specifically configured to perform combination processing on the downlink data which is sent by the other user equipment and is received through the first short distance communication bearer and downlink data received through a radio bearer of the first system bearer of the user equipment.

Figure 6A:
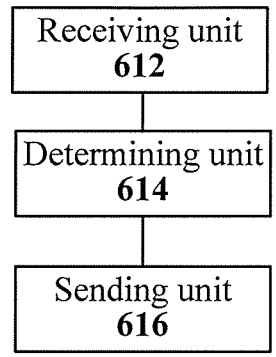
FIG. 6A is a flowchart of a communication apparatus according to an embodiment of the present invention.

FIG. 6A is a flowchart of a communication apparatus according to an embodiment of the present invention, where the communication apparatus includes:

a receiving unit 612, configured to receive uplink data which is sent, through a first radio bearer, by a first user equipment;

a confirming unit 614, configured to, after the receiving unit receives the uplink data, check, according to a context of the first user equipment stored apparatus used for communication, whether the first radio bearer is a radio bearer that assists a second user equipment except the first user equipment or a first system bearer of a second user equipment except the first user equipment in transmitting data; and a sending unit 616, configured to, when the confirming unit confirms that the radio bearer exists, send the uplink data to an uplink node through a system bearer of the second user equipment or the first system bearer of the second user equipment.

Further, the receiving unit is further configured to receive uplink data which is sent, through a second radio bearer, by the second user equipment.

Further, the confirming unit is further configured to, after the receiving unit receives the uplink data, check, according to a context of the second user equipment stored apparatus used for communication, whether the second radio bearer is a radio bearer that assists other user equipment except the second user equipment or a system bearer of other user equipment except the second user equipment in transmitting data.

Further, the sending unit is further configured to, when the confirming unit confirms that the radio bearer exists, send the uplink data to the uplink node through the system bearer of the second user equipment or the first system bearer of the second user equipment.

The apparatus further includes:

a processing unit, configured to perform, at a composition layer, combination processing of uplink data on the uplink data received by the receiving unit, where the composition layer is a new functional layer established because the other user equipment except the second user equipment assists the second user equipment or the first system bearer of the second user equipment in transmitting data.

Figure 6B:
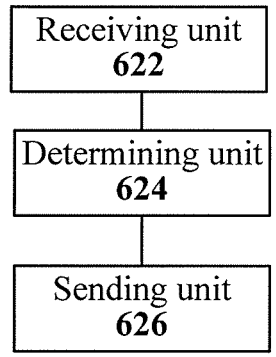
FIG. 6B is a flowchart of a user equipment according to an embodiment of the present invention.

FIG. 6B is a flowchart of a user equipment according to an embodiment of the present invention, where the user equipment includes:

a receiving unit 622, configured to receive, through a first short distance communication bearer, uplink data sent by other user equipment;

a storing unit 624, configured to store information of short distance communication between the user equipment and the other user equipment; and a sending unit 626, configured to send, according to the information of short distance communication stored by the storing unit, the uplink data received by the receiving unit to a base station, where the first short distance communication bearer is a short distance communication bearer which is of the user equipment and is used for assisting the other user equipment or a first system bearer of the other user equipment in transmitting data.

The storing unit is specifically configured to:

store a mapping relationship between the first short distance communication bearer and a first radio bearer, where the first radio bearer is a radio bearer which is established by the user equipment and is used for assisting the other user equipment or the first system bearer of other equipment in transmitting data.

Figure 6C:
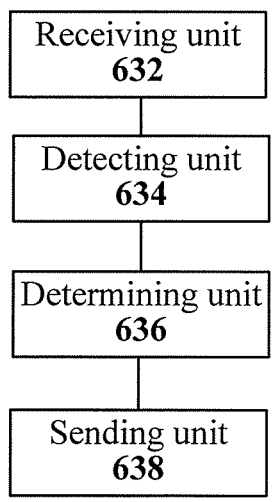
FIG. 6C is a flowchart of another user equipment according to an embodiment of the present invention.

FIG. 6C is a flowchart of other user equipment according to an embodiment of the present invention, where the user equipment includes:

a confirming unit 632, configured to confirm that one user equipment in the user equipment needs to transmit uplink data through a first system bearer of the one user equipment;

a detecting unit 634, configured to detect, according to a context stored by the one user equipment, whether a short distance communication bearer which is of other user equipment except the one user equipment in the user equipment and is used for assisting the one user equipment or the first system bearer in transmitting data exists in the one user equipment;

a determining unit 636, configured to, when the detecting unit detects the short distance communication bearer, determine, in the one user equipment and the other user equipment, a user equipment suitable for transmitting the uplink data; and a sending unit 638, configured to, when the user equipment determined by the determining unit is the one user equipment, send the uplink data to a base station through a radio bearer of the first system bearer of the one user equipment; or configured to, when the user equipment determined by the determining unit is at least one user equipment in the other user equipment, send the uplink data to the at least one user equipment through a short distance communication bearer between the one user equipment and the at least one user equipment.

The determining unit is specifically configured to:

determine, in the one user equipment and the other user equipment, a user equipment in a best radio link condition that transmits the uplink data to the base station.

The present invention further provides a communication system, including the base station according to FIG. 5A, the user equipment according to FIG. 5B and the user equipment according to FIG. 5C.

The present invention further provides another communication system, including the base station according to FIG. 6A, the user equipment according to FIG. 6B and the user equipment according to FIG. 6C.

The present invention further provides another communication system, including the base station according to FIG. 5A, the user equipment according to FIG. 5B, the user equipment according to FIG. 5C, the base station according to FIG. 6A, the user equipment according to FIG. 6B and the user equipment according to FIG. 6C.

It can be seen from the foregoing description that, according to the technical solution provided by the embodiment of the present invention, a base station and a first user equipment use one or more user equipments which are suitable for transmitting data and are in user equipments including other user equipment and the first user equipment to transmit uplink data or downlink data of the first user equipment. In this way, through mutual assistance between multiple UEs, even though a radio environment of a source UE/destination UE deteriorates, other UE may be selected to assist the source UE/destination UE, which is similar to that the source UE/destination UE always has a radio environment of a UE with a best radio environment among the multiple UEs, thereby, relative to the prior art, improving a throughput rate and/or reliability of data transmission of a user equipment.

Through the description of the foregoing implementation manners, a person skilled in the art may clearly understand that, the present invention may be implemented in a manner of hardware, or firmware, or a combination of them. When the present invention is implemented by using software, the foregoing functions may be stored in a computer readable medium or used as one or multiple instructions or codes in a computer readable medium for transmission. The computer readable medium includes a computer storage medium and a communication medium, where the communication medium includes any medium convenient to transmit a computer program from one place to another place. The storage medium may be any available medium that can be accessed by a computer. The following is taken as an example instead of a limitation: A computer readable medium may include a RAM, a ROM, an EEPROM, a CD-ROM or other optical disk storage, magnetic click medium or other magnetic storage devices, or any other medium that can be used for carrying or storing expected program codes with instructions or data structure forms and can be accessed by a computer. Moreover, any connection may appropriately become a computer readable medium. For example, if the software is transmitted from a website, a server or other remote sources by using a coaxial cable, an optical fiber and cable, a twisted pair, a digital subscriber line (DSL) or a radio technology such as infrared ray, radio and microwave, the coaxial cable, the optical fiber and cable, the twisted pair, the DSL or the radio technology such as the infrared ray, the radio and the microwave are included in definition of the medium. The disk (Disk) and the disc (disc) used in the present invention include a compact disc (CD), a laser disc, an optical disk, a digital versatile disc (DVD), a floppy disk and a blue-ray disc, where the disk generally copies data magnetically, and the disc copies data optically with lasers. The foregoing combination should also be included in the protection scope of the computer readable medium.

In conclusion, the preceding description is merely exemplary embodiments of the technical solutions of the present invention, but is not intended to limit the protection scope of the present invention. Any modification, equivalent replacement, or improvement made within the spirit and principle of the present invention shall fall within the protection scope of the present invention.

What is claimed is:

1. A method used for communication, the method comprising:

receiving, at a base station, downlink data through a first system bearer of a first user equipment;

detecting, by the base station, according to a context of the first user equipment stored by the base station itself, whether a radio bearer which is of other user equipment except the first user equipment and assists the first user equipment or the first system bearer in transmitting data exists in the base station;

if the radio bearer exists, selecting, by the base station, from the first user equipment and other user equipment except the first user equipment, at least one user equipment that transmits the downlink data; and sending, by the base station, the downlink data through a specified radio bearer corresponding to the at least one user equipment, wherein the specified radio bearer is a radio bearer which is in the base station and is used in the at least one user equipment for assisting the first user equipment or the first system bearer in transmitting data, and comprises a radio bearer of the first user equipment or a radio bearer of the first system bearer.

2. The method according to claim 1, wherein selecting, by the base station, from the first user equipment and other user equipment except the first user equipment, at least one user equipment that transmits the downlink data comprises:

selecting, by the base station, from the first user equipment and the other user equipment except the first user equipment, a user equipment in a best radio link condition.

3. The method according to claim 1, further comprising:

receiving, by a first user equipment, through a first radio bearer of the first user equipment, downlink data sent by a base station; and sending, according to stored information of short distance communication with a second user equipment, the downlink data to the second user equipment, wherein the first radio bearer is a radio bearer of the first user equipment that assists the second user equipment or a first system bearer of the second user equipment in transmitting data.

4. The method according to claim 3, wherein the stored information of short distance communication with the second user equipment comprises:

a mapping relationship stored by the first user equipment, wherein the mapping relationship comprises a mapping relationship between a first short distance communication bearer and the first radio bearer, wherein the first short distance communication bearer is a short distance communication bearer which is established by the first user equipment and is used for assisting the second user equipment or a first system bearer of the second equipment in transmitting data.

5. The method according to claim 1, further comprising:
receiving, by a first user equipment, through a first short distance communication bearer, downlink data sent by a second user equipment; and
processing the downlink data at a composition layer according to first short distance communication bearer information stored by the first user equipment,
wherein the first short distance communication bearer is a short distance communication bearer of the second user equipment that assists the first user equipment or a first system bearer of the first user equipment in transmitting data; and
the composition layer is a new functional layer established because other user equipment except the first user equipment assists the first user equipment or the first system bearer of the first user equipment in transmitting data.

6. The method according to claim 5, wherein processing the downlink data at a composition layer comprises:
performing combination processing on the downlink data which is sent by the second user equipment and is received through the first short distance communication bearer and downlink data received through a radio bearer of the first system bearer of the first user equipment.

7. A method used for communication, comprising:
receiving, at a base station, uplink data which is sent, through a first radio bearer, by a first user equipment;
checking, according to a context of the first user equipment stored by the base station, whether the first radio bearer is a radio bearer that assists a second user equipment except the first user equipment or a first system bearer of a second user equipment except the first user equipment in transmitting data; and
when a checking result is positive, sending, by the base station, the uplink data to an uplink node through a system bearer of the second user equipment or the first system bearer of the second user equipment.

8. The method according to claim 7, further comprising:
receiving, at the base station, uplink data which is sent, through a second radio bearer, by the second user equipment,
checking, according to a context of the second user equipment stored by the base station, whether the second radio bearer is a radio bearer that assists other user equipment except the second user equipment or a system bearer of other user equipment except the second user equipment in transmitting data; and
when a checking result is negative, sending, by the base station, the uplink data to the uplink node through the system bearer of the second user equipment or the first system bearer of the second user equipment.

9. The method according to claim 7, wherein before sending, by the base station, the uplink data to an uplink node through a system bearer of the second user equipment or the first system bearer of the second user equipment, the method further comprises:
performing, by the base station, at a composition layer, combination processing on the uplink data, wherein the composition layer is a new functional layer established because the other user equipment except the second user equipment assists the second user equipment or the first system bearer of the second user equipment in transmitting data.

10. The method according to claim 7, further comprising:
receiving, by a first user equipment, through a first short distance communication bearer, uplink data sent by a second user equipment; and
sending the uplink data to a base station according to stored information of short distance communication with the second user equipment,
wherein the first short distance communication bearer is a short distance communication bearer which is in the first user equipment and is used for assisting the second user equipment or a first system bearer of the second user equipment in transmitting data.

11. The method according to claim 10, wherein the stored information of short distance communication with the second user equipment comprises:
a mapping relationship stored by the first user equipment, wherein the mapping relationship comprises a mapping relationship between the first short distance communication bearer and a first radio bearer, wherein
the first radio bearer is a radio bearer which is established by the first user equipment and is used for assisting the second user equipment or the first system bearer of the second equipment in transmitting data.

12. The method according to claim 7, further comprising:
when a first user equipment in a user equipment needs to transmit uplink data through a first system bearer of the first user equipment, detecting, according to a context stored by the first user equipment, whether a short distance communication bearer which is of other user equipment except the first user equipment in the user equipment and is used for assisting the first user equipment or the first system bearer in transmitting data exists in the first user equipment;
when a detection result is positive, determining, in the first user equipment and the other user equipment, a user equipment suitable for transmitting the uplink data;
when the determined user equipment is the first user equipment, sending the uplink data to a base station through a radio bearer of the first system bearer of the first user equipment; and
when the determined user equipment is at least one user equipment in the other user equipment, sending the uplink data to the at least one user equipment through a short distance communication bearer between the first user equipment and the at least one user equipment.

13. The method according to claim 12, wherein determining, in the first user equipment and the other user equipment, a user equipment suitable for transmitting the uplink data comprises:
determining, in the first user equipment and the other user equipment, a user equipment in a best radio link condition that transmits the uplink data to the base station.

14. An apparatus used for communication, the apparatus comprising:
a receiving unit, configured to receive downlink data through a first system bearer of a first user equipment;
a detecting unit, configured to, after the receiving unit receives the downlink data, detect, according to a context of the first user equipment stored apparatus used for communication, whether a radio bearer which is of other user equipment except the first user equipment and assists the first user equipment or the first system bearer in transmitting data exists in a base station;
a selecting unit, configured to, if the detecting unit detects that the radio bearer exists, select, from the first user equipment and the other user equipment except the first user equipment, at least one user equipment that transmits the downlink data; and a sending unit, configured to send, through a specified radio bearer corresponding to the at least one user equipment that is selected by the selecting unit, the downlink data received by the receiving unit, wherein the specified radio bearer is a radio bearer used in the at least one user equipment for assisting the first user equipment or the first system bearer in transmitting data, and comprises a radio bearer of the first user equipment or a radio bearer of the first system bearer.

15. The apparatus according to claim 14, wherein the selecting unit is configured to:

select, from the first user equipment and the other user equipment except the first user equipment, a user equipment in a best radio link condition.

16. A user equipment, comprising:

a receiving unit, configured to receive, through a first radio bearer of the user equipment, downlink data sent by a base station;

a storing unit, configured to, after the receiving unit receives the downlink data, store information of short distance communication between the user equipment and other user equipment; and a sending unit, configured to send, according to the information of short distance communication between the user equipment and other user equipment that is stored by the storing unit, the downlink data received by the receiving unit to the other user equipment, wherein the first radio bearer is a radio bearer of the user equipment that assists the other user equipment or a first system bearer of the other user equipment in transmitting data.

17. The apparatus according to claim 16, wherein the storing unit is configured to:

store a mapping relationship between a first short distance communication bearer and the first radio bearer, wherein the first short distance communication bearer is a short distance communication bearer which is established by the user equipment and is used for assisting the other user equipment or the first system bearer of the other user equipment in transmitting data.

18. A user equipment, comprising:

a receiving unit, configured to receive, through a first short distance communication bearer, downlink data sent by other user equipment;

a storing unit, configured to store first short distance communication bearer information; and a processing unit, configured to process, at a composition layer, according to the first short distance communication bearer information stored by the storing unit, the downlink data received by the receiving unit, wherein the first short distance communication bearer is a short distance communication bearer of the other user equipment that assists the user equipment or a first system bearer of the user equipment in transmitting data, and wherein the composition layer is a new functional layer established because the other user equipment except the user equipment assists the user equipment or the first system bearer of the user equipment in transmitting data.

19. The apparatus according to claim 18, wherein the processing unit is configured to perform combination processing on the downlink data which is sent by the other user equipment and is received through the first short distance communication bearer and downlink data received through a radio bearer of the first system bearer of the user equipment.

* * * * *